(12) United States Patent
Carlsson et al.

(10) Patent No.: US 8,959,427 B1
(45) Date of Patent: Feb. 17, 2015

(54) SYSTEM AND METHOD FOR JAVASCRIPT BASED HTML WEBSITE LAYOUTS

(75) Inventors: Dave Carlsson, Mountain View, CA (US); David Ko, San Lorenzo, CA (US)

(73) Assignee: Google Inc., Mountain View, CA (US)

( * ) Notice: Subject to any disclaimer, the term of this patent is extended or adjusted under 35 U.S.C. 154(b) by 153 days.

(21) Appl. No.: 13/198,982

(22) Filed: Aug. 5, 2011

(51) Int. Cl.
  *G06F 17/30* (2006.01)
(52) U.S. Cl.
  USPC .......................................................... 715/236
(58) Field of Classification Search
  CPC ........................................................ G06F 17/30
  USPC .......................................................... 715/236
  See application file for complete search history.

(56) References Cited

U.S. PATENT DOCUMENTS

| 8,260,802 B2 * | 9/2012 | Rajkumar et al. ............ 707/769 |
| 2006/0212790 A1 * | 9/2006 | Perantatos et al. ......... 715/501.1 |
| 2007/0204013 A1 * | 8/2007 | Castrucci ..................... 709/219 |
| 2011/0191407 A1 * | 8/2011 | Fu et al. ....................... 709/203 |
| 2012/0131439 A1 * | 5/2012 | Hill et al. ..................... 715/234 |

* cited by examiner

*Primary Examiner* — Adam M Queler
*Assistant Examiner* — Tionna Burke
(74) *Attorney, Agent, or Firm* — Johnson, Marcou & Isaacs, LLC

(57) ABSTRACT

The disclosure describes exemplary methods and systems for building search-friendly websites from templates on a browser based or web-enabled stand-alone website builder application. The website builder application is an HTML page with JavaScript function calls and HTML content blocks enclosed with JavaScript functions. Each HTML content block includes HTML content and HTML IDs. The HTML page includes style scripts that update to reflect retailer implemented template property changes. When the user chooses a different layout for the website template, inputs to a JavaScript moving function in the form of HTML IDs of the origin HTML content and a destination HTML content block cause the JavaScript moving function to re-write the HTML content of the origin HTML content block to the destination HTML content block. The JavaScript moving function removes the origin HTML content block. The CSS styling from the destination HTML content block automatically applies to the static HTML content.

21 Claims, 5 Drawing Sheets

SYSTEM AND METHOD FOR JAVASCRIPT BASED HTML WEBSITE LAYOUTS

TECHNICAL FIELD

The present disclosure relates generally to a method and system for generating JavaScript based HTML website layouts using a website builder application.

BACKGROUND

A programmer may use one or a combination of several programming languages (for example, HTML, PHP, JavaScript etc.) to build a website. A website is a collection of interlinked files that typically deploys in real-time on a host server which serves as a hosting backend computing device for addressing purposes. The hosting backend computer device transfers these website files to any client computing devices when a visitor uses a browser on a client computing device to browse the website. A "visitor," herein referred to as an "end-user," typically enters the address of the hosting backend computing device, thereby enabling the transfer of website files to the end-user's computing device. A browser on the end-user's device executes certain website files to generate the website for display on the end-user's display. An address of the backend computing device typically includes, either an internet protocol or IP address of the backend computing device, or its URL (Uniform Resource Locator).

For people who lack the programming knowledge for building websites, webhosting companies provide website builder tools that use pre-defined templates to create a website. These pre-defined templates use complex backend programming languages that appear as simple user-interface tools to the person building the website. The website builder tool allows users with no programming experience to customize the website content by editing text, color, images, forms, and adding/removing content into pre-defined areas on the chosen template. The user may typically publish the pre-defined template with the custom information into a live, real-time format on the hosting backend computing device. The result is a website that typically includes several browser-executable files with interlinked custom images, text, forms, and other interactive applications on a pre-defined main template file.

Website builder tools typically incorporate server-side programming technology to include custom textual content in a manner that prevents or inconveniences a website crawler from effectively indexing the site for search-engine purposes. One such server side technology embeds textual content into images for display on the final website. Search engines use website crawlers, which in turn uses key-words, texts, meta-tags and other information from within a website to recognize and index webpages within a website. The text crawling software codes do not typically read textual content from images.

"Small business owners," herein referred to as "retailers," typically sell merchandize, content, or services from their own websites. Such retailers face disadvantages when crawlers do not index their website, thereby disabling the site from appearing on popular search engines. Further, when an existing website offers a new product or service via an updated webpage, there is a need for immediate indexing of the webpage to inform web-based customers of the new product. A website with fixed style definitions in the form of cascade style sheets (CSS) needs updates to reflect any changes in the webpage design, such as, changes to fonts, sizes, colors, spacing, etc. Re-writing CSS files based on a customized design has to apply to the entire webpage and not to certain sections alone. This process creates large files, is time-consuming, and requires additional conflict checks for different page locations to prevent overlap of styling.

SUMMARY OF THE DISCLOSURE

This disclosure describes exemplary embodiments for a computer-implemented method and system for generating JavaScript based HTML website layouts. The method and system includes a frontend computing device for rendering a website builder application, the website builder application including software functions for transferring a first retailer request for a website template to a backend computing device; the backend computing device for sending a first Hypertext Markup Language (HTML) webpage to the website builder application in response to the first retailer request, the webpage including: a first Hypertext Markup Language (HTML) content block in a first location in the HTML webpage, the first HTML content block including static HTML content to be published online, and with a first unique HTML identification code (ID); at least one second HTML content block in a second location on the HTML webpage, the second HTML content block with a second unique HTML ID; a Cascade Style Sheet (CSS) script defining the style for the second HTML content block; client-side scripting language to dynamically move the static HTML content from the first HTML content block to the second HTML content block, wherein the client-side scripting language includes scripts for: inputting the HTML ID of the first HTML content block as an origin location and the HTML ID of the second HTML content block as a destination location; re-writing the static HTML content from the origin location to the destination location, based on the HTML IDs input; and removing the first HTML content block.

DETAILED DESCRIPTION

Overview

Figure 1:
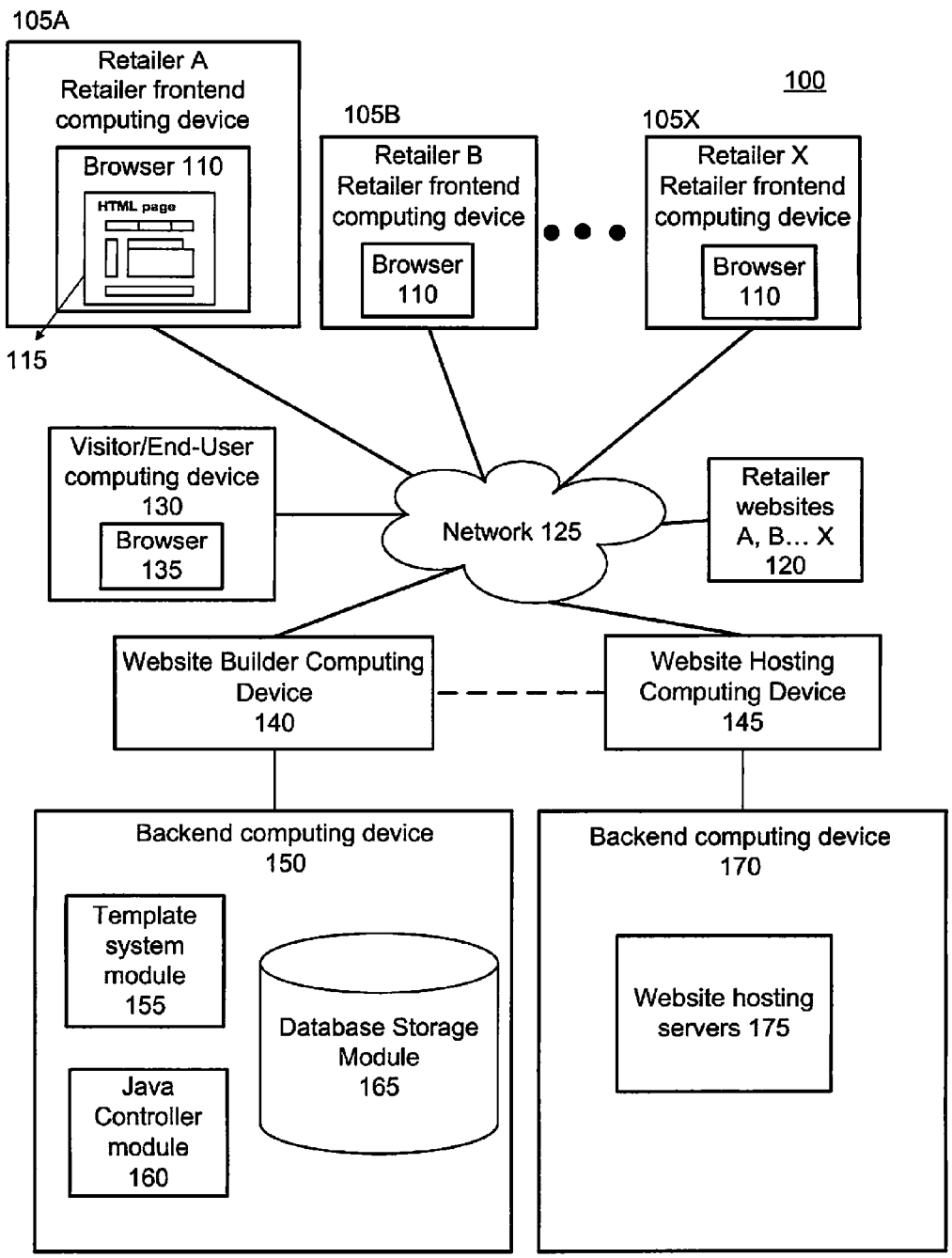
FIG. 1 depicts a block diagram for generating JavaScript based HTML website layouts using a website builder application according to certain exemplary embodiments.

Websites provide businesses and individuals with an opportunity to develop an online presence, and reach a wider target customer base. Small businesses, in particular, use websites as a portal for marketing, information, and sales, thereby enabling them to reach customers even without an actual physical presence. However, it is also important for customers to be able to find businesses online based on their requirements. In the physical world, it is instinctive for a person to search for an electronics store if the person is seeking to buy an electronic product; this analogy applies to virtual businesses as well, where a person often uses an online searching tool to find a store selling the product, content, advertising web space, or service that is required. "Product", "content," "advertising web space", and "services" are used interchangeably in this disclosure, and will herein be referred to as "merchandize". While online business, like their physical counterparts use marketing methods by advertising on popular websites in a 'push' marketing strategy (to push products and services to consumers), it is also important to maintain a wide online presence to enable the 'pull' concept of marketing, where consumers actively search and find their merchandize. Online search tools or search engines have, therefore, become a useful tool for businesses to be able to maintain an online presence. Further, some retail websites incorporate a search engine optimization process to make the pages within the retail website more search-friendly to both, a software crawling tool and the consumer.

In certain exemplary embodiments, a system and method for building JavaScript based HTML website layouts using a website builder application, thereby generating search-friendly websites. These website layouts assist a person without the skill and knowledge in software, web programming, and search engine optimization to create a retail website for selling merchandize. The method utilizes a web-based software application, where most of the design and data is loaded from a backend server of a website builder company that offers an interactive user-interface on a retailer's computing device. The user-interface on the retailer's computing device, herein referred to as the "website builder application", typically exists as a stand-alone application with web access or via a browser window where the retailer logs into a website hosted by the website builder company and access the website builder application.

In certain exemplary embodiments, the website builder application includes a number of editable templates, each incorporating pre-defined template properties (e.g., font color, background color, images, text blocks, etc.) and layout (e.g., arrangement of the text blocks, images, and other content) for the retailer to choose from. The template options and related page content information for each webpage of the website being developed is transferred from the website builder's backend computing device once the website builder application is loaded. Once the retailer has chosen a combination of the template properties and layout template defining the retail website design, the retailer can upload photos, create forms, add content, and include other tools, like chat-boxes, etc., where applicable. In another example, the website builder application may not reconnect with the backend computing device when the user selects a different design or layout template. The changes to the template, in this case, may apply dynamically, in real-time, to the static HTML content developed by the retailer.

In certain exemplary embodiments, the backend website builder application on the website builder backend computing device generates, from a JAVA controller, a default template content including default HTML content, default HTML content block positions, and JavaScript function calls. A template scripting language that acts as containers for the HTML content, HTML content block positions, and JavaScript codes on the default template page then encompasses the default template. In certain exemplary embodiments, the template scripting language typically compiles into either JAVA at the server-side JAVA controller or JavaScript at the client-side JavaScript enabled browser. "Template script" used in this disclosure refers to a scripting language, which is different from "website template" or simply "template", where "template" is a standard website page layout or design into which content may be added. JavaScript is typically a browser-side or client-side scripting language, as it typically useful in applications that render within browsers on client devices. JAVA is preferably a server side language, but is also useful in some client-side browsers and stand-alone applications that require extensive client-side permissions for full functionality.

In certain exemplary embodiments, a template scripting language can be Soy templates (or Closure Templates), which can be compiled into either JAVA or JavaScript. The JAVA controller can, therefore, generate the default HTML content, content block position information, and JavaScript function calls, while the Soy template scripts create template scripts to encompass the HTML content and position information. The template typically compiles into JavaScript containers for the HTML content blocks and JavaScript function calls at the website builder's backend computing device, where the JavaScript codes typically embeds into an HTML page for rendering in the retailer's browser on the retailer's frontend computing device. The use of the template scripts between the JAVA controller and retailer's frontend computing device provides advantages in the form of highly reduced browser side files for faster compilation, single language platforms for faster request and responses, and improved security by using better cross-site scripting prevention methods, among other advantages.

In certain exemplary methods, the retailer can make changes to the template design or layout, which results in dynamic allocation of the HTML content into the new layout on the user interface of the website builder application. The retailer can then choose to save and publish (or deploy) the chosen layout with retailer-defined HTML content. The action of saving the chosen website template and the retailer-defined HTML content may result in updated HTML and CSS files sent to the website builder's backend computing device for storage in a database storage area. When the retailer needs to make changes to the website, the retailer may log back into the website builder application via a browser and retrieve the saved template, make further design or layout changes and content changes to the template. A benefit to using a template scripting language is the ability of the website builder's backend computing device to use JAVA controller functions to control JAVA requests to and from the backend database storage area on the server-side with high efficiency, while, at the same time, preparing the data received from the database storage area to be rendered on the browser-side via JavaScript codes. The intermediate template scripts typically compile according to the requirements on each side may generate both the JAVA controller functions and the JavaScript codes.

In certain exemplary embodiments, when the user chooses a different layout template or moves the HTML content from an origin pre-defined location to a destination pre-defined location on the template in the website builder application, changes typically deploys immediately, where underlying JavaScript functions re-write the HTML content in the new location, and remove the origin content block. Additionally, the styling of the HTML content block is such that pre-defined template properties that control the font and content block characteristics in the destination location imposes on the HTML content, and content block properties of the origin content block do not carry over. The styling may be applied using a styling codes, such as, Cascade Style Sheet (CSS), where for each default template in the website builder's backend computing device, a CSS file stores stylistic information on template properties for the whole template as well as pre-defined locations for the content blocks on each of the templates. Empty or default HTML content blocks may pre-define locations where the HTML content can move to and from. Each of these HTML content blocks retains independent HTML IDs, as well as, independent CSS styling template properties. Editing the properties of the HTML content block typically changes the styling that is applicable to the HTML content within the HTML content block. Changes made by the retailer typically apply to the HTML content dynamically at the website builder application, while being simultaneously transmitted for storage to a backend database storage area on the website builder backend computing device or a separate database server.

In certain exemplary embodiments, when the retailer implements an HTML content move from one HTML content block to another on the webpage, a listener JavaScript function call passes the HTML IDs of the two content blocks into a JavaScript function call as inputs for content block moving. The JavaScript moving function re-writes the HTML content from the origin HTML content block to a destination HTML content block and deletes the origin HTML content block. The CSS template property of the destination HTML content block applies to the HTML content. This entire process may be dynamic to the HTML content without requiring server responses.

In certain exemplary embodiments, the HTML content blocks can be of two types, the pre-defined fixed HTML content blocks which cannot be moved and may be a core webpage component, for example, headers, footers, main, etc., and other pre-defined HTML content blocks for moving custom HTML content. For the custom HTML content blocks, identifications apply for each HTML content block via HTML IDs, while class-names identify the pre-defined fixed HTML content blocks. This ensures that there is no need to loop through all the DIV elements to identify, for the purposes of updates, the appropriate content block. A DIV element is a division or section of the HTML content in an HTML script file. The HTML content in each fixed or custom HTML content blocks can be styled via CSS styling assigned to the block. Different color codes typically identify the various CSS styles and content blocks in the website builder application. When the template publishes to a website hosting backend computing device, based on a retailer submission, the color codes do not appear on the page, the static HTML content with the designated CSS styling as applied to each HTML content block displays for the end-user of the published retail website. By retaining the text-based HTML content for the published retail website, it is appreciated that the website is search-friendly and web-crawling software can easily index new and old content as appropriate, from the website. The exemplary embodiments described herein provide the retailer with a dynamic and interactive retail website that still retains good search engine optimization capabilities.

In certain exemplary embodiments, the website builder application may be provided by the website hosting company, thereby eliminating the need for two backend computing devices—one for webhosting and one for website building purposes. However, in certain exemplary embodiments, in the interest of supporting web traffic, and multi-tier approach, the backend website builder service provider may split certain elements of the retail website into database tier, web tier, and application tier. In certain exemplary embodiments, the database tier stores retailer merchandize data, such as product information, prices, reviews, etc., while the application tier provides backend support for web-based forms, emails, etc., and the web tier provides the actual HTML, CSS and JavaScript files that form the published webpage.

System Architecture

FIG. 1 depicts a block diagram 100 of system for generating JavaScript based HTML website layouts using a website builder application according to certain exemplary embodiments. Retailer frontend computing devices 105A-105X can be personal computers, laptops, smart phones, or any computing device with a processor and memory. The retailer frontend computing devices 105A-105X include software for a web-browser application 110 or a web-enabled stand alone application that access the website builder application 115 through network 125. The retailer frontend computing devices 105 communicate, through a network 125, with the website builder computing device 140. The backend website builder computing device 140 includes the template system module 155 and Java Controller 160 that generate the template scripts required to render the website builder application 115 on Browser 110.

The website builder backend computing device 150 may include a multi-tier architecture for each of the modules 155, 160, and 165. A combination of a web-tier server for the template system 165, an application-tier server for the Java Controller 160, and a database server (shown as module 165) may be implemented as a backend computing device 150. The database server module 165 stores default as well as custom template information, HTML content, HTML content block positions, images and other information for use by the retailer to design the website. In certain exemplary embodiments, the database server module 165 is accessible by a website hosting computing device 145 including hosting servers 175, via the website builder computing device 140, where the website hosting server is the primary host for any retail website built by the retailer. The website hosting commuting device 145 hosts the active website files, when the retailer publishes the website as a retailer website 120 on the internet. The website files may be transferred from the database server module 165 when the retailer selects to publish the retail website. Any changes on the database sever does not affect the live website until the user chooses to publish the content, whereupon the host server transfers, to the end-user's computing device, the script files that render as the website on the end-user's browser 135.

The website builder computing device 140 provides services, such as the backend website builder application tools and may include the website hosting servers 175. The application tools in the backend computing device 150 includes a JAVA controller module with JAVA controller library files and JAVA database server functions, while the template system module 155 includes JAVA and JavaScript compilers, template compilers, template library functions, HTML hosting applications, JavaScript application tools, and other related components. In certain exemplary embodiments, a retailer using Retailer frontend computing device 105 may not be knowledgeable in programming, website development, or search engine optimization methods. The retail typically purchases the services of a website builder application 115 from a website builder service provider via a website builder online website hosted by the website builder computing device 140. The retailer can have access to the web-enabled stand-alone website builder application or a browser-based website builder application 110, both accessible via the retailer's frontend computing device.

In certain exemplary embodiments, different service provider companies can provide the hosting of the website and the website builder application. The retailer may choose templates and layouts, and may add images, HTML content, forms, and other website functions to the chosen template based on the business related requirements of the retailer.

Business rules applicable to transactions for the retailer may be determined at this time and applies to the retail website accordingly. JavaScript moving functions save the website HTML content 115 created by the retailer to the database storage module 165, while simultaneously publishing to the website hosting backend computing device 145 in servers 175. A host server 175 can use a copy of the website files from database module 165 to render the website on an end-user's web browser 110, when the end-user visits the retail website 120 via an end-user computing device 130. Depending on the HTML content added to the website, JavaScript codes may offer additional website functionalities, such as ordering, tracking, invoicing, and cataloging to the retail website's end users via the retail website 120. A database in the website hosting backend computing device 140, different from the database storage module 165 typically stores customer information from the additional functions offered on the retail website, such as invoicing, tracking, etc. This customer information is typically made available to the retailer via applications like e-mails, web mailers, or account information tools on the website builder application 200.

System Process

Figure 2:
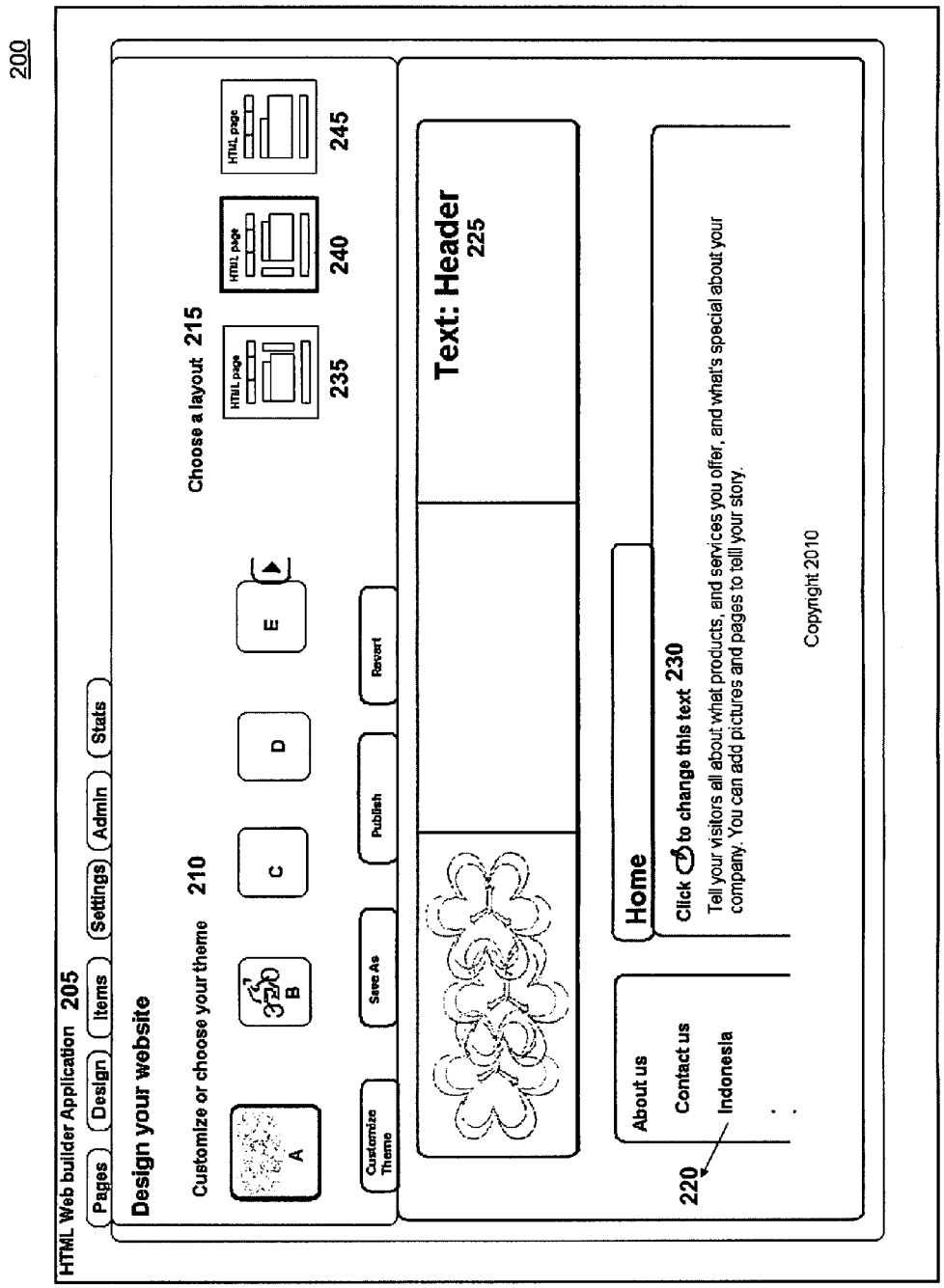
FIG. 2 depicts an HTML website builder application for generating JavaScript based HTML website layouts according to certain exemplary embodiments.

FIG. 2 depicts an HTML website builder application 200 on a retailer's browser for generating JavaScript based HTML website layouts according to certain exemplary embodiments. The website builder application 200 includes a website builder application user interface 205 in an HTML script with embedded JavaScript function calls that perform end-user and retailer-side functions. The options offered on the website builder application 200 includes a choice of themes 210, as well as a choice of layouts 215 for moving HTML content in HTML content blocks 220 and 230. The choice of themes 210, including A, B, C, D, and E, add color, images, template properties, and texture to the website template 215. The published website can resemble the layout templates 215 indicating pre-determined areas for moving the HTML content. In the exemplary embodiment, as illustrated in FIG. 2, the layout templates 235, 240, and 245 have three different HTML content block options; the column 220 on the right of the HTML content block in 230 (in template 235), the column on the left of the HTML content block in 340 (in template 240), and template 245, which has no column content block.

When the user chooses to apply one of the three available layout templates, JavaScript moving functions re-write the HTML content in HTML content blocks 220 and 230 into the new layout locations. Alternatively, the retailer may interactively move HTML content block 220/230, including the HTML content, into different locations 235-245 on the webpage template 215, where the layout template includes different pre-defined colors for possible HTML content locations. If, by way of an example, the left column 220 is moved, by a drag and drop method, to the location on the right of the page to form a right column as illustrated in layout template 235, an embedded JavaScript moving function call recognizes the drag and drop process, and accepts the HTML IDs of the left column 220 in template 240 and the destination right column (right of content block 230), as illustrated in template 235 as inputs to the function call. The JavaScript moving function initiates re-write of the HTML content from the original right column 220 of template 240 into destination column (right of block 230) as illustrated in 235, while removing the left column HTML content block 220. The JavaScript moving function may also move content block 230 to provide room when the left column content block 220 in template 240 moves to a right column position as illustrated in template 235. JavaScript listening functions provides the HTML IDs of the original content block 230 and the destination content block as inputs to the JavaScript moving function to enable the move.

In certain exemplary embodiments, the HTML text within the HTML content blocks that are moved remains the same, while new CSS styling from pre-defined or custom CSS styling scripts applies to HTML text in the destination column. This exemplary method illustrates dynamic re-arrangement of HTML content without changing the CSS script files, while retaining the search-friendly benefits of the text-based HTML content on a flexible user interface 205. The HTML website builder application 200 may also include default text in the HTML content blocks 220 and 230, which can be edited by typing in the appropriate HTML content areas, as illustrated in FIG. 2.

Figure 3:
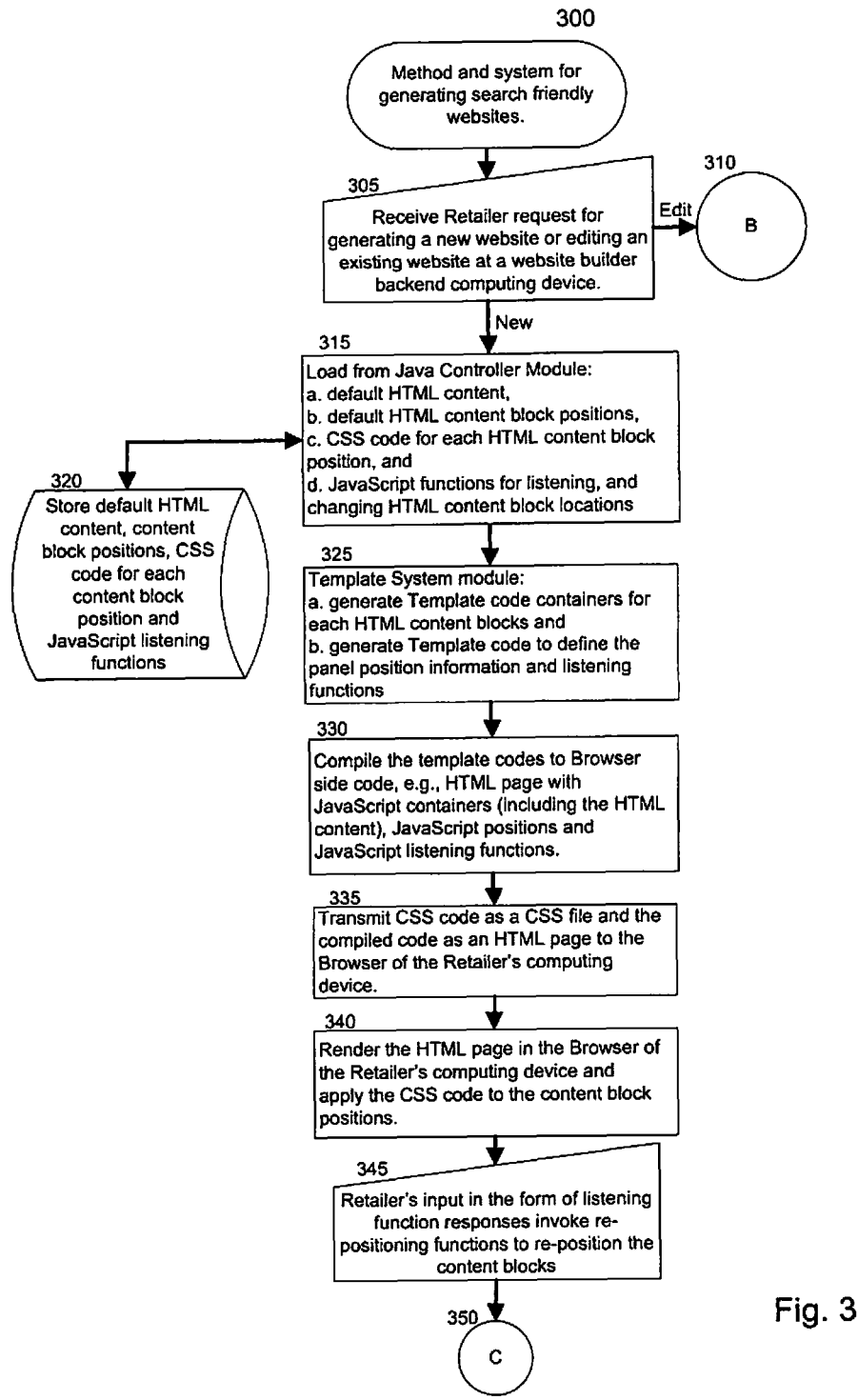
FIG. 3 depicts a flowchart of a method and system for building JavaScript based HTML website layouts according to certain exemplary embodiments.

FIG. 3 depicts a flowchart of a method and system 300 for generating JavaScript based HTML website layouts using a website builder application according to certain exemplary embodiments. The website builder backend computing device receives retailer requests from a browser on a retailer frontend computing device, the requests are for either editing a retail website or generating a new retail website, as illustrated in block 305. For a new retail website, a default website template is generated by the website builder backend computing devices using the JAVA controller and soy templates to manipulate the default HTML content, JavaScript listening functions, and HTML content block position information. This default information is loaded from a database storage area in the website builder backend computing device as illustrated in block 320. Block 315 illustrates the loading of default information in HTML, CSS, and JavaScript files from the storage database using JAVA requests, and transfer of the default information to the template system module for template script definition. The template script code may be compiled to JavaScript codes with JavaScript function calls for the HTML content and content positions as illustrated in block 330. Further, block 330 illustrates that the compiled JavaScript codes can be embedded into the HTML script to function as the user interface 205 for the website builder application 200 as illustrated in FIG. 2.

In certain exemplary embodiments, the template script may be compiled on the server-side in a process for optimizing the template script or the compiled JavaScript code. This process removes white (or empty) code, redundant code, comments, and other redundancies, and provides clean embedded JavaScript in an HTML page to the retailer's frontend computing device. The HTML page for the website builder application including the embedded JavaScript codes can then be transmitted, along with the CSS file relevant to the default template, to the retailer's frontend computing device for rendering in the retailer's browser window. This process is illustrated in block 340.

The retailer on the website builder application 200 may make changes to the default template by moving the HTML content blocks, choosing different templates, changing template properties, and adding website functionalities (e.g., forms, images, etc). Block 345 illustrates a process of accepting these website changes as retailer inputs to the underlying embedded JavaScript function calls that monitor (or listen) retailer interaction on the website builder user interface HTML page 205. Retailer input from block 345 passes on to block 350, via JavaScript listening functions for dynamically editing the default retailer website template.

Figure 4:
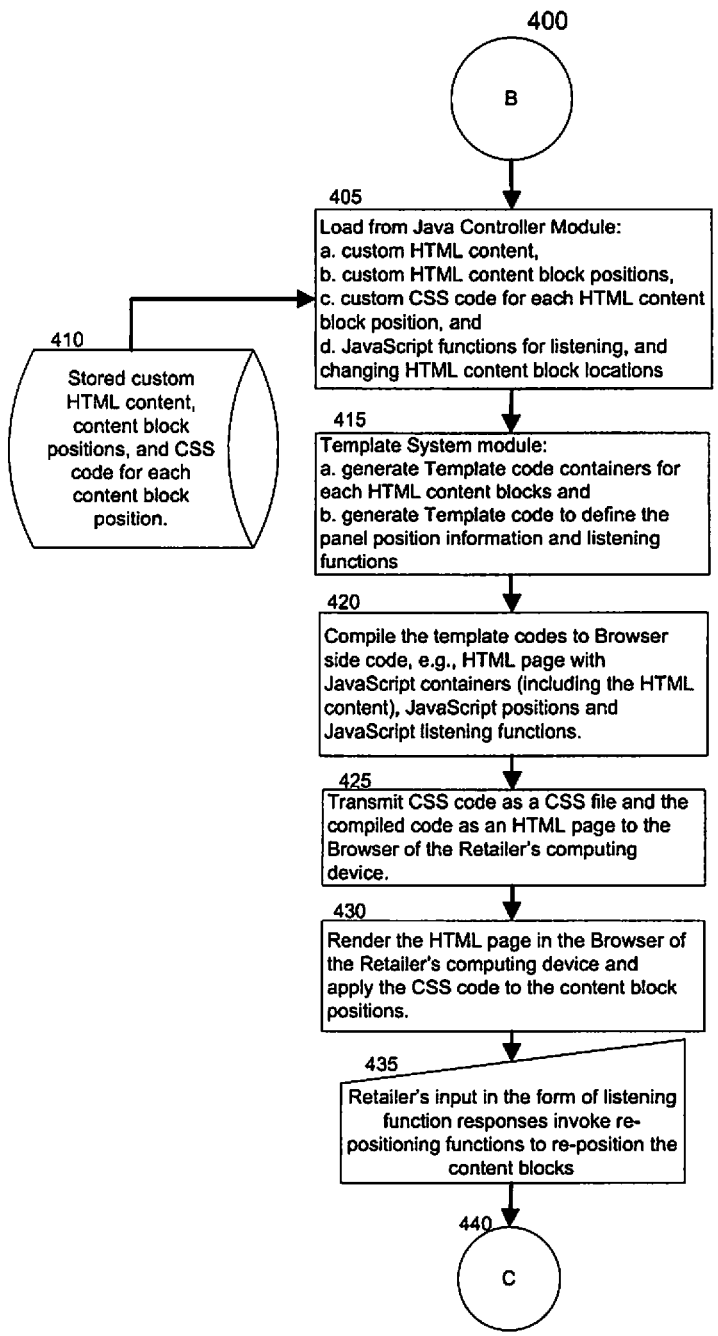
FIG. 4 depicts a flowchart of the method and system for building JavaScript based HTML website layouts according to certain exemplary embodiments.

In certain exemplary embodiments, if the retailer has an existing custom retail website, the retail may request the website builder application 205 to edit the existing retail website. This is illustrated in block 310, where continuation to the flowchart in FIG. 4 illustrates the method 400 of editing JavaScript based HTML website layouts using a website builder application. Block 405 illustrates loading of existing custom HTML content, content block positions, and applicable CSS files from the storage database based on requests made by the JAVA controller. The template system module generates template scripts to encompass the custom information from the database storage as illustrated in block 415. The custom website can be generated as an HTML page with underlying JavaScript containers for the HTML content, content positions, and function calls implemented to listen for retailer requests on the website builder application HTML page 205. The retail requests are then used edit the custom website template based on several customizable features discussed above.

Figure 5:
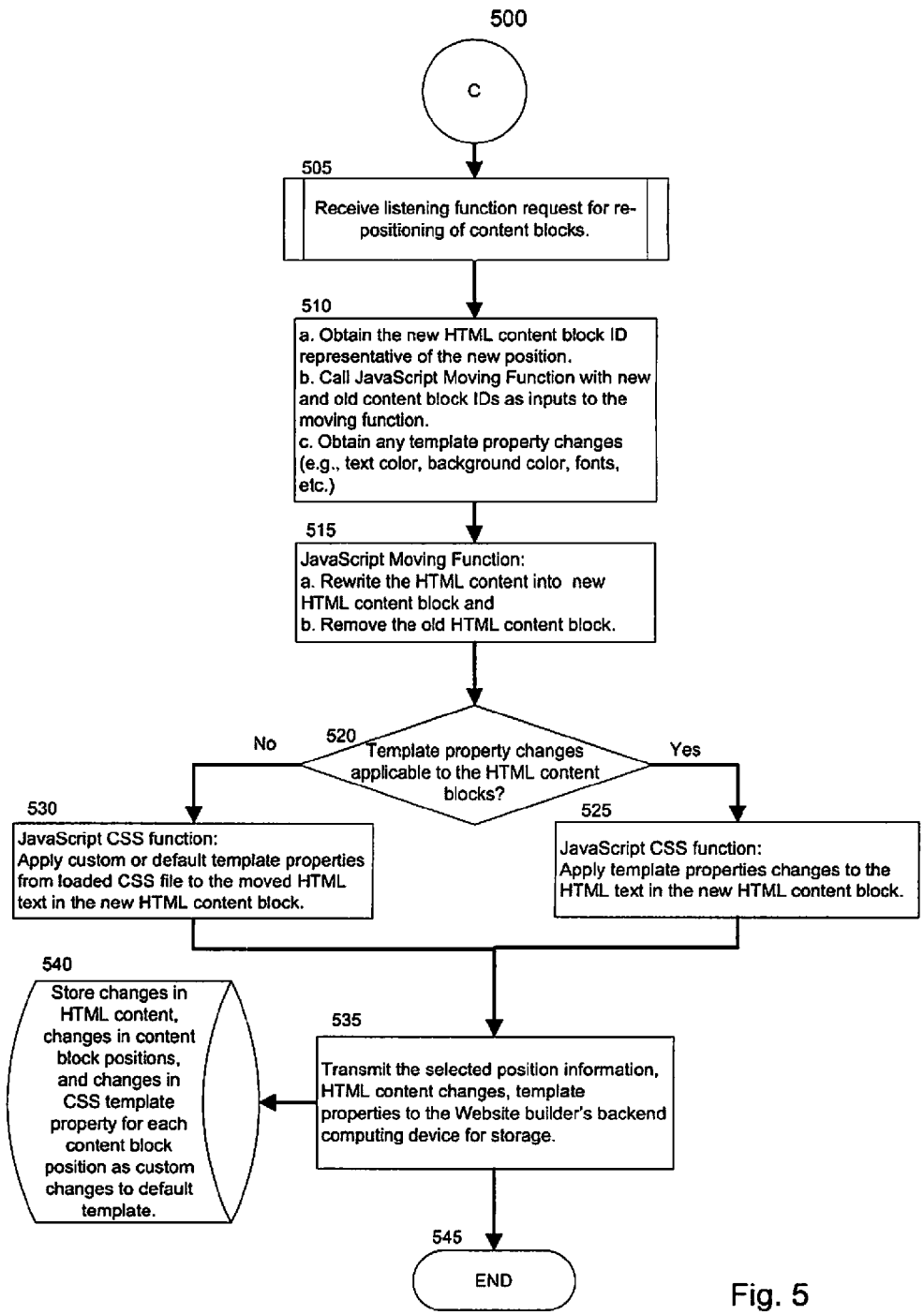
FIG. 5 depicts a flowchart of the method and system for building JavaScript based HTML website layouts according to certain exemplary embodiments.

In certain exemplary embodiments, on receipt of the edit option at the retailer input 345 of flowchart 300, the function calls evaluates whether it is a template layout edit 215, a template theme edit 210, or a template properties edit (applicable to the CSS stylistic changes to the HTML content block). FIG. 5 depicts a flowchart of the method and system for a JavaScript based HTML website layout 500 according to certain exemplary embodiments. For a layout template edit 215, any new HTML content can be collected at the HTML content block, and a JavaScript moving function may be called, via block 505, for moving the HTML content. The origin and destination HTML content block IDs are passed to the JavaScript moving function as previously disclosed, and illustrated in block 510. With the HTML IDs of the origin and destination HTML content blocks as inputs, the JavaScript function call for moving, block 515 re-writes the static HTML content in the destination HTML content block and removes the origin HTML content block. The update results in a dynamic update of the static HTML content on the user interface of the website builder application 200, i.e., the retailer sees the new retail template with changes applied immediately.

Block 520 illustrates a method, where JavaScript CSS functions determine if the template property has been changed, and then marks the changes as custom CSS changes to every applicable content block. The new template information, including CSS changes, HTML content changes, position changes, etc., is stored periodically from the website builder application 200 to the database server module in the website builder backend computing device as illustrated in block 540. In certain exemplary embodiments, when the user chooses to save the current design, JavaScript storing functions transfer or the moving function transmits the changed HTML content, and HTML content block positions to the JAVA Controller for storage in the storage database, while simultaneously initiating a dynamic template change at the website builder application. In certain exemplary embodiments, for a repeat retailer who intends to edit an exiting retail website, certain JavaScript listening functions may be applied for verifying the existence of a saved template, thereafter loading the saved retail website template from the storage database. In an exemplary embodiment, the backend website builder application generates an initial HTML page for the website builder application 205 for display to the website retailer, where the HTML page has only JavaScript listening functions, an HTML introduction page, and no default website template.

In another embodiment, the website builder application 200 allows the user to update CSS properties of the HTML content block, such as, to change the color, font, or size of the text and spacing between subsequent texts, etc. The options in block 525 implements this change, where the change is obtained at block 510 and implemented by a JavaScript CSS function 525 or 530. Each function is a JavaScript function call which verifies the type of changes effected on the website template and implements responsive changes to the stored files. The template CSS changes causes updates to the default CSS template in the stored database for the particular default website template selected by the retailer, thereby converting the default template into a custom website template. It is appreciated that, block 530 includes use of the default template specific CSS which is stored in the database module of the website builder backend computing device 150 as a safety net, if the user needs to revert to the default styling for a template.

General

The exemplary methods and systems described in this disclosure are illustrative, and, in alternative embodiments, certain steps can be performed in a different order, in parallel with one another, omitted entirely, and/or combined between different exemplary embodiments, and/or certain additional acts can be performed, without departing from the scope and spirit of this disclosure. Accordingly, such alternative embodiments are included in the inventions described herein.

The exemplary embodiments can be used with computer hardware and software that perform the methods and processing functions described above. As will be appreciated by those having ordinary skill in that art, the systems, methods, and procedures described herein can be embodied in a programmable computer, computer executable software, or digital circuitry. The software can be stored on computer readable media. For example, "computer-coded," "software," "scripts," and "programs" are software codes used interchangeably for the purposes of simplicity in this disclosure. Further, "memory" and storage can include such media as, floppy disk, RAM, ROM, hard disk, removable media, flash memory, memory stick, optical media, magneto-optical media, CD-ROM, etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for JavaScript based HTML website layouts, the method comprising:
    receiving, by one or more computing devices, a request to generate a website;
    in response to receiving the request, generating, by the one or more computing devices, a Hypertext Markup Language (HTML) website, wherein the HTML website comprises at least;
        a first HTML content block, wherein the first HTML content block comprises static HTML content to be published online and a first HTML identification code (ID);
        at least one second HTML content block, wherein the second HTML content block comprises a second HTML ID, and receiving, by the one or more computing devices, a request to move the static HTML content from the first HTML content block to the second HTML content block;

in response to receiving the request to move the static HTML content, inputting, by the one or more computing devices, the first HTML ID of the first HTML content block as an origin location of the static HTML content and the second HTML ID of the second HTML content block as a destination location for the static HTML content;

re-writing, by the one or more computing devices, the static HTML content from the first HTML content block to the second HTML content block, based on inputting the first HTML ID as the origin location and the second HTML ID as the destination location;

in response to re-writing the static HTML content from the first HTML content block to the second HTML content block, removing, by the one or more computing devices, the static HTML content from the first HTML content block;

transmitting, by the one or more computing devices, the HTML website, as modified by the re-writing and the removing, to one or more frontend computing devices.

2. The method according to claim 1, wherein the HTML website further comprises scripting language, wherein the scripting language comprises JavaScript functions in JavaScript computer code.

3. The method according to claim 1, wherein the HTML website is embedded with JavaScript computer code.

4. The method according to claim 3, wherein the HTML website is generated by compiling a template script in the one or more computing devices, wherein the template script can be compiled to both, a server-side scripting language and a client-side scripting language.

5. The method according to claim 4, wherein the template script is Closure Template script or Soy Template script.

6. The method according to claim 1, wherein the HTML content blocks are differentiated by fixed HTML content blocks, which cannot be moved, and custom HTML content blocks, which can be moved.

7. The method according to claim 1, wherein:
the request to move static HTML content from the first HTML content block to the second HTML content block is initiated by a script language listening function,
the re-writing is performed by a script language re-writing function, and
the removing is performed by a script language removing function.

8. A computer system for generating JavaScript based HTML website layouts, the system comprising:
a storage device; and
a processor configured to execute computer-executable instructions stored in the storage device to cause the system to:
receive a request to generate a website;
generate a Hypertext Markup Language (HTML) website, wherein the HTML website comprises at least:
a first HTML content block, wherein the first HTML content block comprises static HTML content to be published online and a first HTML identification code (ID),
at least one second HTML content block, wherein the second HTML content block comprises a second HTML ID,
a Cascade Style Sheet (CSS) script, wherein the CSS script defines a style for the second HTML content block, and
scripting language to move the static HTML content from the first HTML content block to the second HTML content block;
receive a request to move the static HTML content from the first HTML content block to the second HTML content block;
input the first HTML ID of the first HTML content block as an origin of the static HTML content and the second HTML ID of the second HTML content block as a destination location for the static HTML content;
re-write the static HTML content from the origin HTML content block to the destination HTML content block, based on the HTML IDs input; and
remove the static HTML content from first HTML content block.

9. The system of claim 8, wherein the scripting language comprises JavaScript functions in JavaScript computer code.

10. The system of claim 8, wherein the HTML website is embedded with JavaScript computer code.

11. The system of claim 10, wherein the HTML website is generated by compiling a template script in the computing device, where the template script can be compiled to both, a server-side scripting language and a client-side scripting language.

12. The system of claim 11, wherein the template script is Closure Template script or Soy Template script.

13. The system of claim 8, wherein the HTML content blocks are differentiated by fixed HTML content blocks, which cannot be moved, and custom HTML content blocks, which can be moved.

14. The system of claim 8, wherein:
the request to move static HTML content from the first HTML content block to the second HTML content block is initiated by a script language listening function,
the re-writing is performed by a script language re-writing function, and
the removing is performed by a script language removing function.

15. A computer program product, comprising:
a non-transitory computer-readable medium having computer-readable program instructions embodied therein that when executed by a computer cause the computer to generate JavaScript based HTML website layouts, the computer-readable program instructions comprising:
computer-readable program instructions to receive a request to generate a website;
computer-readable program instructions to generate a Hypertext Markup Language (HTML) website, wherein the HTML website comprises at least:
a first HTML content block, wherein the first HTML content block comprises static HTML content and a first HTML identification code (ID), and
at least one second HTML content block, wherein the second HTML content block comprises a second HTML ID;
computer-readable program instructions to receive a request to move the static HTML content from the first HTML content block to the second HTML content block;
computer-readable program instructions to input the first HTML ID of the first HTML content block as an origin of the static HTML content and the second HTML ID of the second HTML content block as a destination for the static HTML content;
computer-readable program instructions to re-write the static HTML content from the origin HTML content block to the destination HTML content block, based on the HTML ID input; and computer-readable program instructions to remove the first HTML content block.

16. The computer program product of claim 15, wherein the HTML website further comprises scripting language, wherein the scripting language comprises JavaScript functions in JavaScript computer code.

17. The computer program product of claim 15, wherein the HTML website is embedded with JavaScript computer code.

18. The computer program product of claim 17, wherein the HTML website is generated by compiling a template script in the one or more computing devices, wherein the template script can be compiled to both, a server-side scripting language and a client-side scripting language.

19. The computer program product of claim 18, wherein the template script is Closure Template script or Soy Template script.

20. The computer program product of claim 15, wherein the HTML content blocks are differentiated by fixed HTML content blocks, which cannot be moved, and custom HTML content blocks, which can be moved.

21. The computer program product of claim 15, wherein:
the request to move static HTML content from the first HTML content block to the second HTML content block is initiated by a script language listening function,
the re-writing is performed by a script language re-writing function, and
the removing is performed by a script language removing function.

* * * * *